United States Patent
Kraus, Jr.

(10) Patent No.: US 9,203,243 B2
(45) Date of Patent: Dec. 1, 2015

(54) SERIAL LOAD LEVELING SYSTEM AND METHOD

(71) Applicant: Harold G. Kraus, Jr., Manhattan, KS (US)

(72) Inventor: Harold G. Kraus, Jr., Manhattan, KS (US)

(73) Assignee: Ultra Electronics ICE, Inc., Manhattan, KS (US)

( * ) Notice: Subject to any disclaimer, the term of this patent is extended or adjusted under 35 U.S.C. 154(b) by 352 days.

(21) Appl. No.: 13/672,619

(22) Filed: Nov. 8, 2012

(65) Prior Publication Data

US 2014/0125148 A1    May 8, 2014

(51) Int. Cl.
*H02J 4/00*    (2006.01)
*H02J 3/14*    (2006.01)

(52) U.S. Cl.
CPC ... *H02J 4/00* (2013.01); *H02J 3/14* (2013.01); *Y10T 307/74* (2015.04); *Y10T 307/747* (2015.04)

(58) Field of Classification Search
CPC ......... H01H 9/061; H01H 9/063; H01H 9/52; H02H 3/12; H02J 9/005; H02J 4/00
USPC ........................................................ 307/126
See application file for complete search history.

(56) References Cited

U.S. PATENT DOCUMENTS

| | | | |
|---|---|---|---|
| 3,648,070 A | 3/1972 | Eicher | |
| 3,721,830 A | 3/1973 | Oishi | |
| 4,348,582 A | 9/1982 | Budek | |
| 4,670,662 A * | 6/1987 | Goldstein et al. | 307/106 |
| 5,264,823 A | 11/1993 | Stevens | |
| 5,691,691 A | 11/1997 | Merwin | |
| 5,798,581 A * | 8/1998 | Keagy et al. | 307/115 |
| 7,246,773 B2 | 7/2007 | Stoner et al. | |
| 7,580,777 B2 | 8/2009 | Smith et al. | |
| 7,708,227 B2 | 5/2010 | Al-Khalil | |
| 7,854,412 B2 | 12/2010 | Al-Khalil | |
| 7,928,663 B1 * | 4/2011 | Kumar | 315/246 |
| 8,430,359 B2 | 4/2013 | Al-Khalil | |
| 2003/0180145 A1 | 9/2003 | Goldberg | |
| 2005/0007257 A1 | 1/2005 | Rast | |
| 2005/0248297 A1 * | 11/2005 | Logsdon et al. | 315/291 |
| 2005/0253563 A1 * | 11/2005 | Logsdon | 320/166 |
| 2007/0290668 A1 * | 12/2007 | Chou et al. | 323/299 |
| 2009/0072091 A1 | 3/2009 | Al-Khalil | |

(Continued)

OTHER PUBLICATIONS

"PCT/US06/44804", PCT International Search Report, Aug. 30, 2007.

*Primary Examiner* — Thienvu Tran
*Assistant Examiner* — Brian K Baxter
(74) *Attorney, Agent, or Firm* — Law Office of Mark Brown, LLC; Mark E. Brown; Christopher M. DeBacker

(57) ABSTRACT

A load leveling system and method capable of controlling switches such that it appears to a generator that the load is constant. The purpose is to prevent high-load simultaneous switching or multiple synchronous switching from damaging sensitive equipment. The present invention utilizes a central controller communicating to a number of switches such that the switches turn off and on in a synchronized, serialized manner. As one switch turns "off," another should be turning "on" until a cycle is completed. In this manner, the generator will only see a single "on" and a single "off" load per cycle. The various switches are scheduled such that, ideally, the power load seen by the power source has emissions of no more than one PWM load superpositioned with zero or more constant, non-modulated loads.

5 Claims, 18 Drawing Sheets

(56) References Cited

U.S. PATENT DOCUMENTS

| | | | |
|---|---|---|---|
| 2010/0076615 A1* | 3/2010 | Daniel et al. | 700/293 |
| 2010/0243811 A1 | 9/2010 | Stothers | |
| 2010/0282910 A1 | 11/2010 | Stothers et al. | |
| 2010/0314940 A1* | 12/2010 | Palmer et al. | 307/39 |
| 2011/0260662 A1* | 10/2011 | Yoshida et al. | 318/400.3 |
| 2012/0126623 A1* | 5/2012 | Koehl | 307/76 |
| 2012/0313430 A1* | 12/2012 | Wu et al. | 307/9.1 |
| 2012/0326618 A1* | 12/2012 | Kim | 315/224 |

* cited by examiner

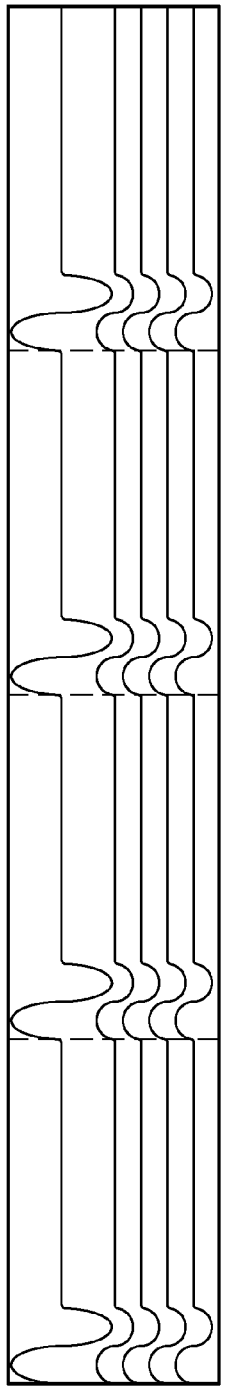
FIG. 4A *PRIOR ART*
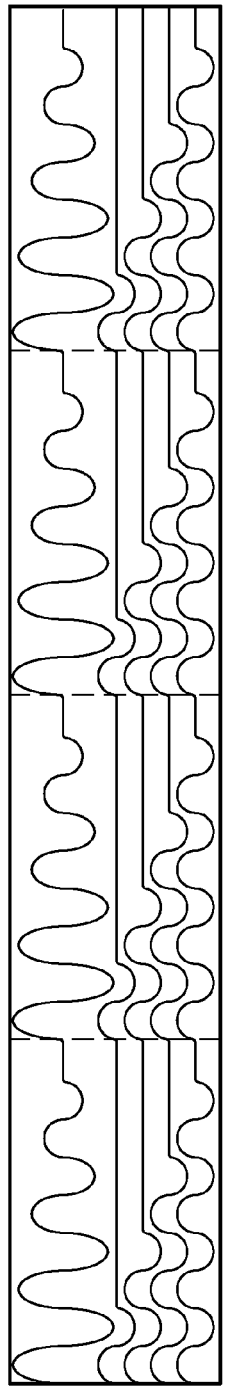
FIG. 4B *PRIOR ART*
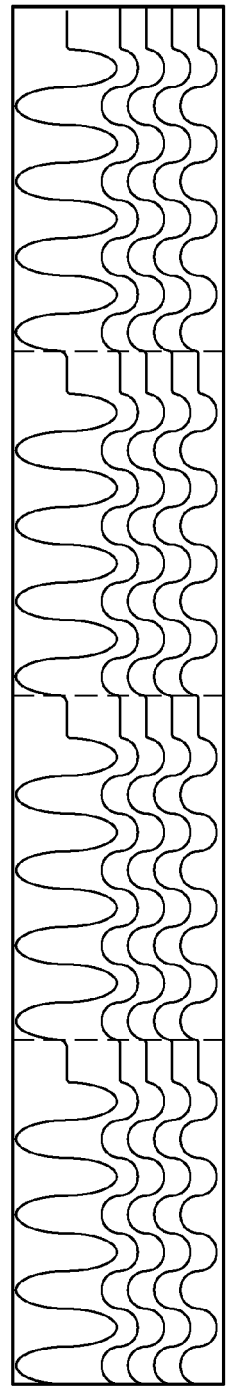
FIG. 4C *PRIOR ART*

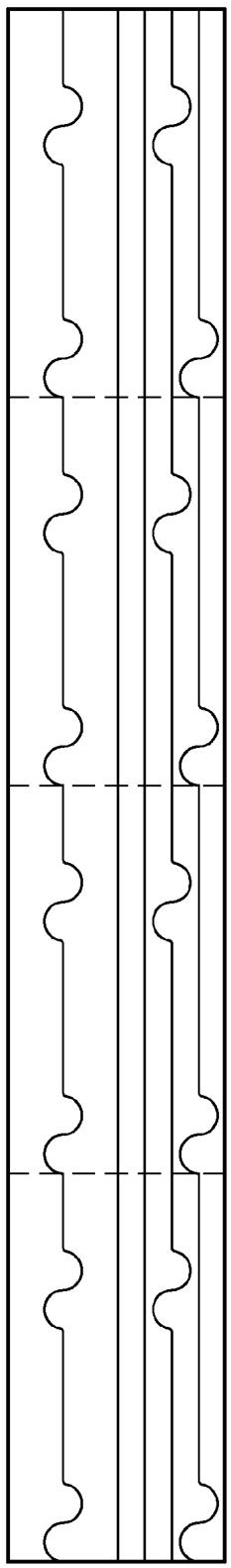
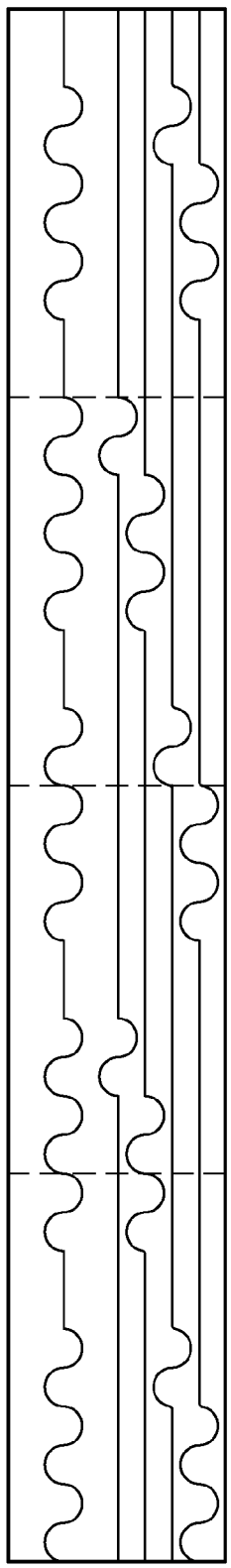
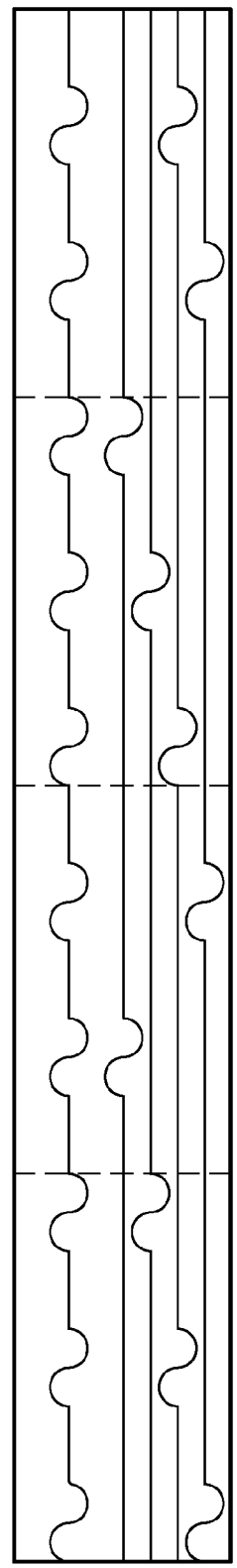
FIG. 6A PRIOR ART
FIG. 6B PRIOR ART
FIG. 6C PRIOR ART

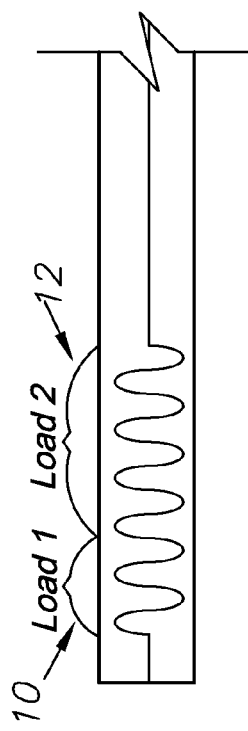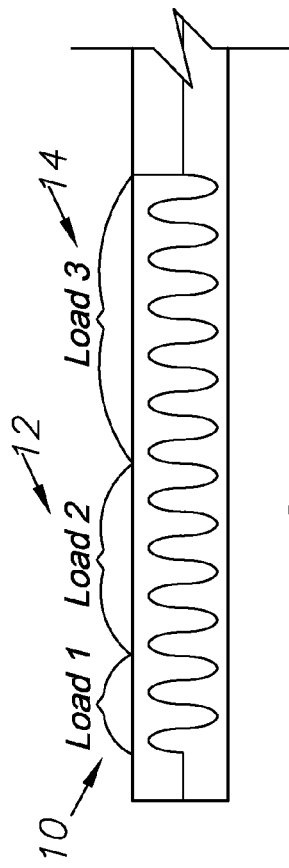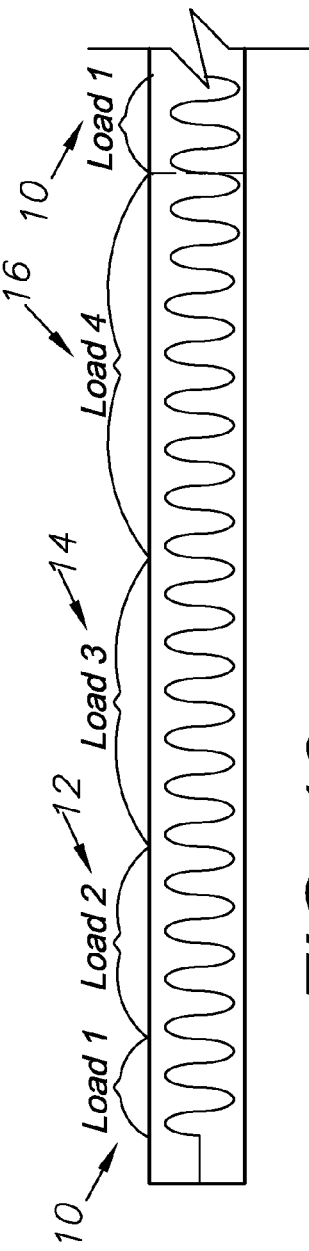

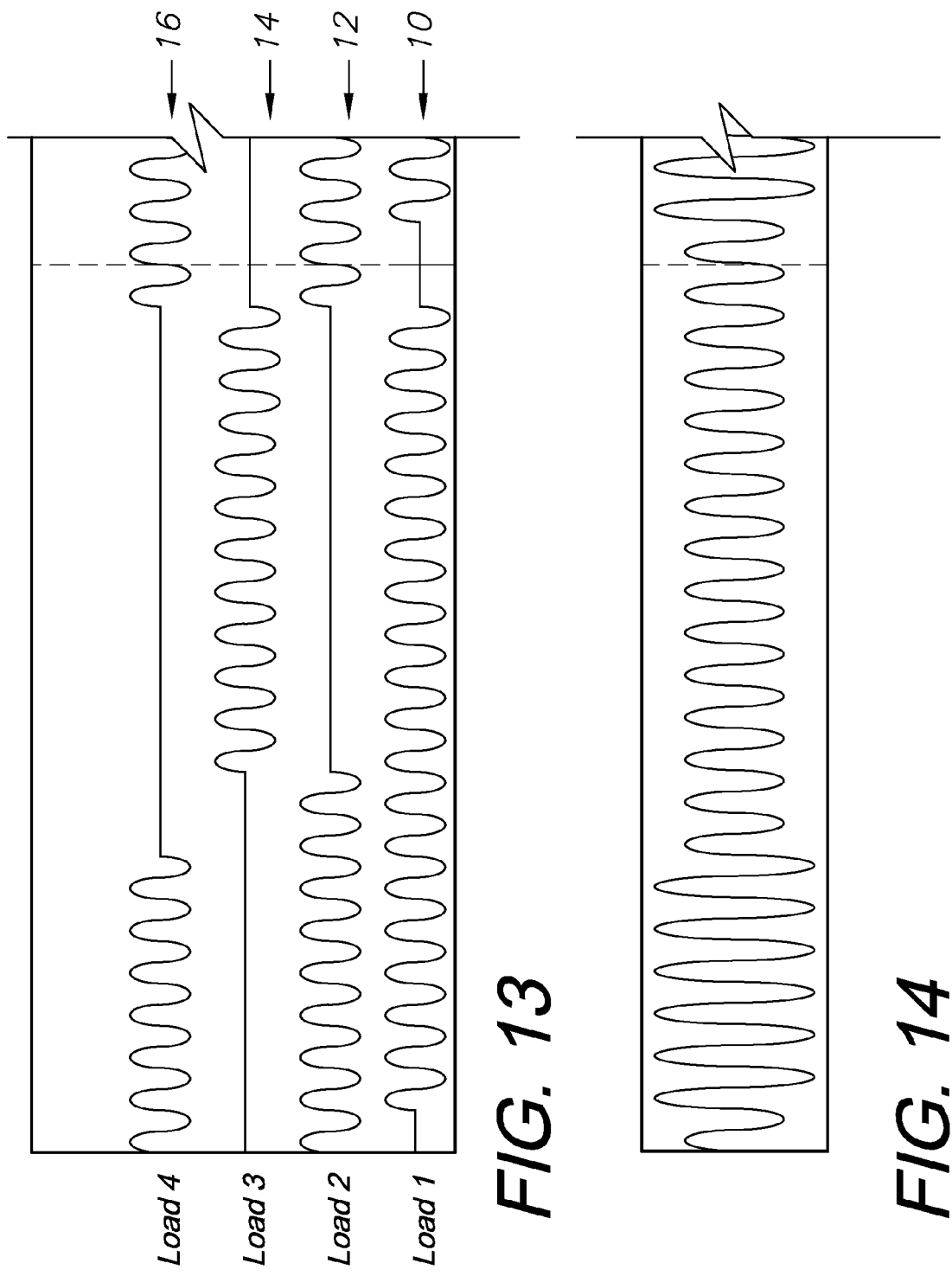

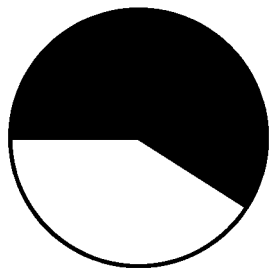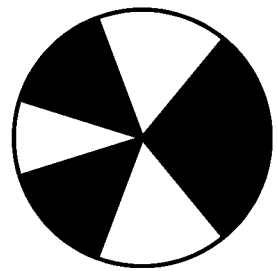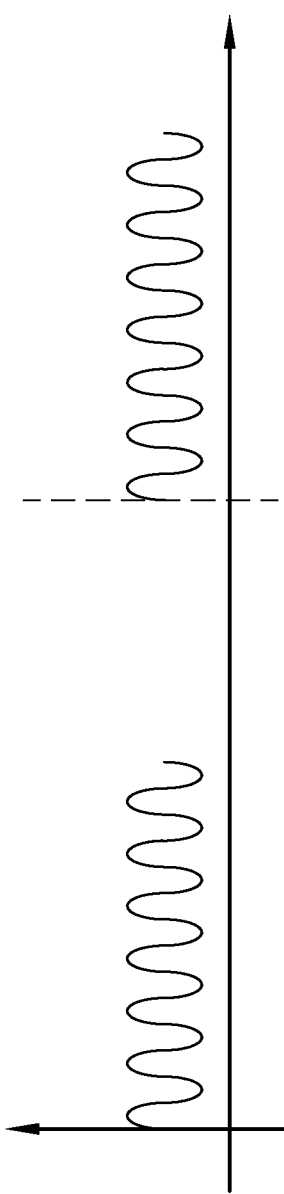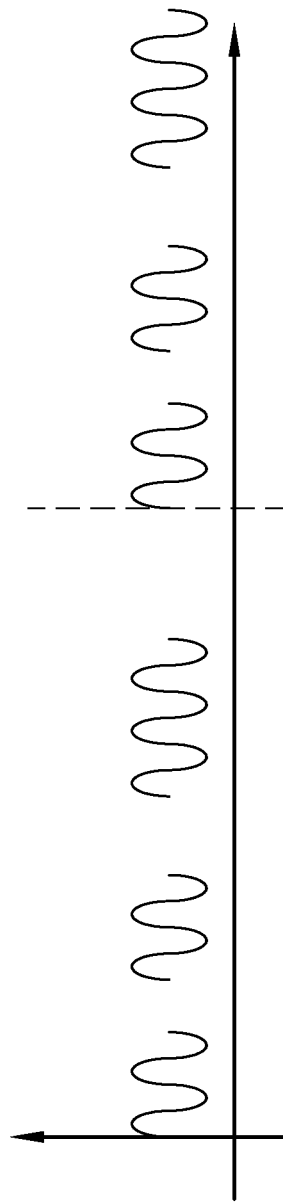

SERIAL LOAD LEVELING SYSTEM AND METHOD

CROSS-REFERENCE TO RELATED APPLICATION

This application claims priority in U.S. Provisional Patent Application No. 61/557,159, filed Nov. 8, 2011, which is incorporated herein by reference.

BACKGROUND OF THE INVENTION

1. Field of the Invention

The present invention relates generally to a system for serial load leveling, and more particularly to a load leveling system for avoidance of compounded emissions in high energy, parallel, or distributed, pulse-modulated power control systems.

2. Description of the Related Art

Avoidance of the effects of simultaneous or coincidental switching of high currents is a challenge for systems having multiple pulse-width modulation (PWM) power switching circuits that share common supplies, enclosures, and other components. Part of the concern is the conducted and radiated EMI emissions resulting from compounded switching transients, but electrical and mechanical effects on the power source are also important.

Such a PWM power switching circuit is disclosed in U.S. patent application Ser. No. 13/479,105, filed on May 23, 2012, which is incorporated herein by reference.

Synchronized switching is preferred in such systems for reasons of determinacy. However, the conducted and radiated EMI effects of switching are compounded when multiple switches change at the same time. For example, FIG. 1 illustrates how simultaneously opening and closing multiple PWM circuits increases emissions far over that of a single PWM load. An additional effect may be observed as multiple synchronized PWM switches potentially combine to cause cumulative waveforms possessing strong fundamental frequencies significantly different than the fundamental frequency of the individual PWM switches.

As such, it is valuable to consider methods that provide determinant switching but reduce emissions, particularly those associated with simultaneous or compounded switching. This can be particularly important on aircraft where certain frequencies must be avoided for the safety of the vehicle.

Existing systems commonly generally distribute the switching events to reduce simultaneous switching. However, these methods retain a wide range of dynamic emissions, a significant portion of which have harmonic characteristics stronger than desired. It is very difficult to determine which of emissions these systems will experience at any moment in operation, so worst case emissions must be accounted.

Given a system with N switches and M possible pulse widths, using current phase spreading techniques, the range of emissions to characterize is on the order of $N^M$. With Serial Load Leveling, the range of emissions with the technique is M, and those emissions are the minimum possible.

There are existing no-spread synchronized switching techniques that are fairly common. In Non-Spread Synchronized Switching systems, PWM switches are synchronized, share a common clock, and turn on simultaneously, but each one turns off separately according to individual duty cycles. An example of such a system is shown in FIG. 2. In a system supplied by a rotating generator, such power pulses have the effect of oscillating torque loads. In such systems, the maximum amplitude of these oscillations is the sum of the loads, e.g., having 4 to 16 loads yields a torque modulation 4-16 times that of a single load. For solid-state power supplies, the oscillating load causes analogous oscillating effects on the filtering and regulating components of the supply. The supply and other system components must be made to be robust to these oscillations, including avoidance of resonance with any significant harmonics.

There are also existing phase spreading techniques. A few methods exist to mitigate the effects of simultaneous switching loads. In general, they distribute or spread the individual PWM phases over the PWM cycle. However, they suffer either from lack of determinacy required for absolute characterization or from retention of significant transient or harmonic effects.

One such example is non-coherent phase spreading. One method of phase spreading is to introduce pseudorandom or non-coherent phase spreading to the PWM switch timing. This may be achieved by such means as random scattering of switch phasing or, more commonly, by reliance on presumed frequency drift of multiple non-coherent (wild) clocks. However, a lack of coherency complicates absolute system verification, that is, verification becomes a statistical exercise. Neither does non-coherent phase spreading eliminate the possibility of transient peaks, sustained problematic waveforms, or resonance.

Phase spreading has additional limitations in AC applications. Whereas phase spreading may have a relatively continuous switching distribution in DC applications, zero-cross AC switching quantizes the distribution—zero-cross AC switching imposes a common clock on all switches, regardless of any spreading.

Heretofore there has not been available a load leveling system or method for a power system with the benefits of the present invention.

BRIEF SUMMARY OF THE INVENTION

The present invention relates to a load leveling system and method capable of controlling switches such that it appears to a generator that the load is constant. The purpose is to prevent high-load simultaneous switching or multiple synchronous switching from damaging sensitive equipment. The present invention utilizes a central controller communicating to a number of switches such that the switches turn off and on in a synchronized, serialized manner. As one switch turns "off," another should be turning "on" until a cycle is completed. In this manner, the generator will only see a single "on" and a single "off" load per cycle.

BRIEF DESCRIPTION OF THE DRAWINGS

The drawings constitute a part of this specification and include exemplary embodiments of the present invention illustrating various objects and features thereof.

FIG. 4A is an "impulse" signal waveform produced by a prior-art non-spread switching means system.

FIG. 4B is a "sawtooth" signal waveform produced by a prior-art non-spread switching means system.

FIG. 4C is a "square" signal waveform produced by a prior-art non-spread switching means system.

FIG. 6A is a signal waveform with significant harmonics produced by a prior-art synchronized phase spreading system.

FIG. 6B is a signal waveform with significant harmonics produced by a prior-art synchronized phase spreading system.

FIG. 6C is a signal waveform with significant harmonics produced by a prior-art synchronized phase spreading system.

FIG. 8 is a signal waveform of a PWM cycle wherein a first load is at 10% and a second load is at 20%.

FIG. 9 is a signal waveform of a PWM cycle wherein a first load is at 10%, a second load is at 20%, and a third load is at 30%.

FIG. 10 is a signal waveform of a PWM cycle wherein a first load is at 10%, a second load is at 20%, a third load is at 30%, and a fourth load is at 40%.

FIG. 13 is a signal waveform of the PWM cycle of FIG. 12, showing the individual loads separately.

FIG. 14 is a signal waveform of the PWM cycle of FIG. 12, showing the combination of loads from the perspective of the power source.

FIG. 16A is a signal waveform diagram representing an imbalanced pulse combination.

FIG. 16B is a signal waveform diagram representing a balanced pulse combination.

DETAILED DESCRIPTION OF THE PREFERRED EMBODIMENTS

I. Introduction and Environment

Figure 1:
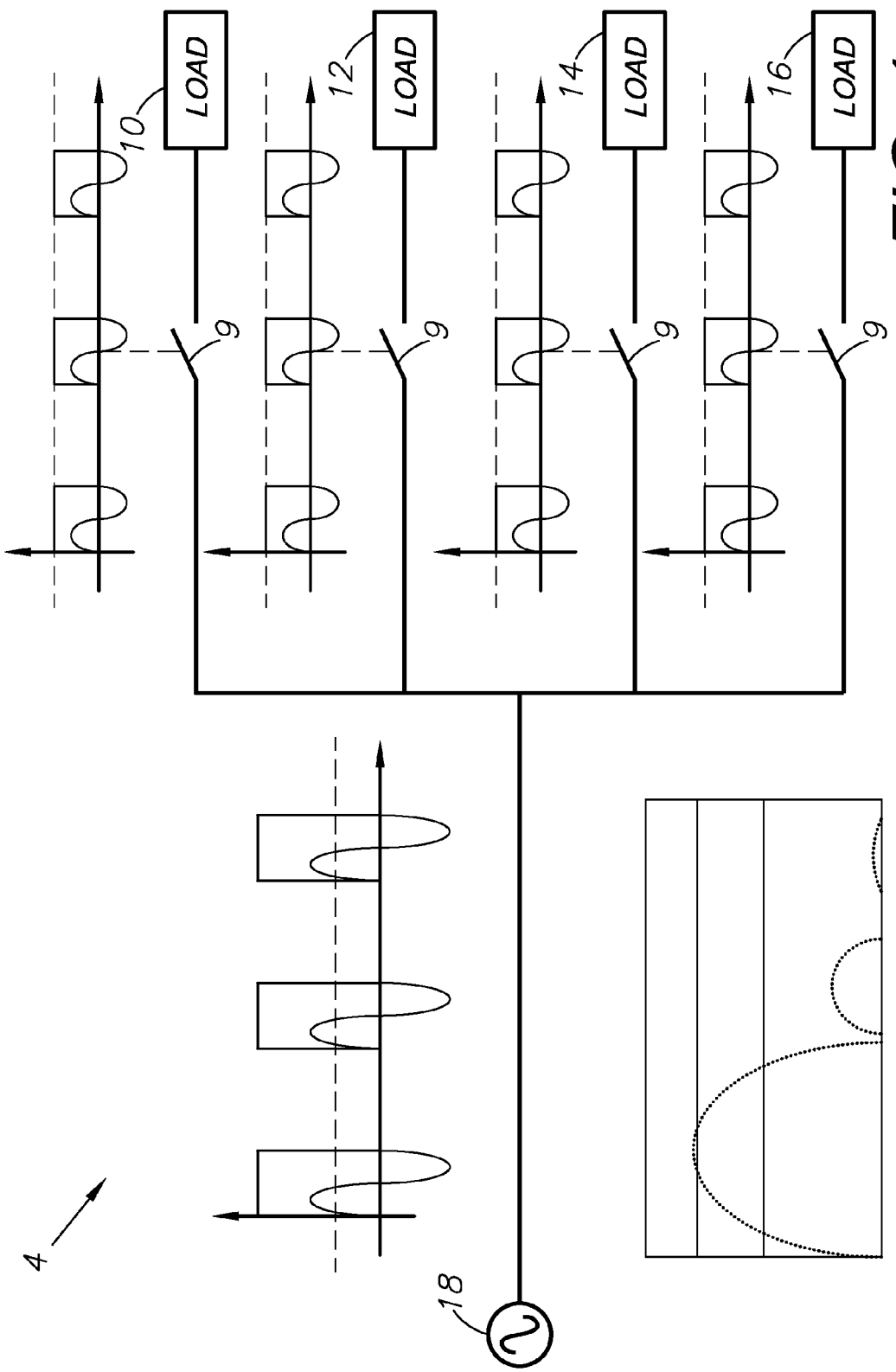
FIG. 1 is a signaling diagram representing a prior-art system with a power source connected to multiple equivalent loads by independent PWM switches, whereby the switches are switched on and off in a non-spread synchronized timing.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

An embodiment of the present invention is generally designed to interface with an aircraft's electrical and control systems.

II. Prior Art Power Load Systems 4, 6

Referring to the drawings in more detail, the reference numeral 2 generally indicates a power distribution system.

Figure 2:
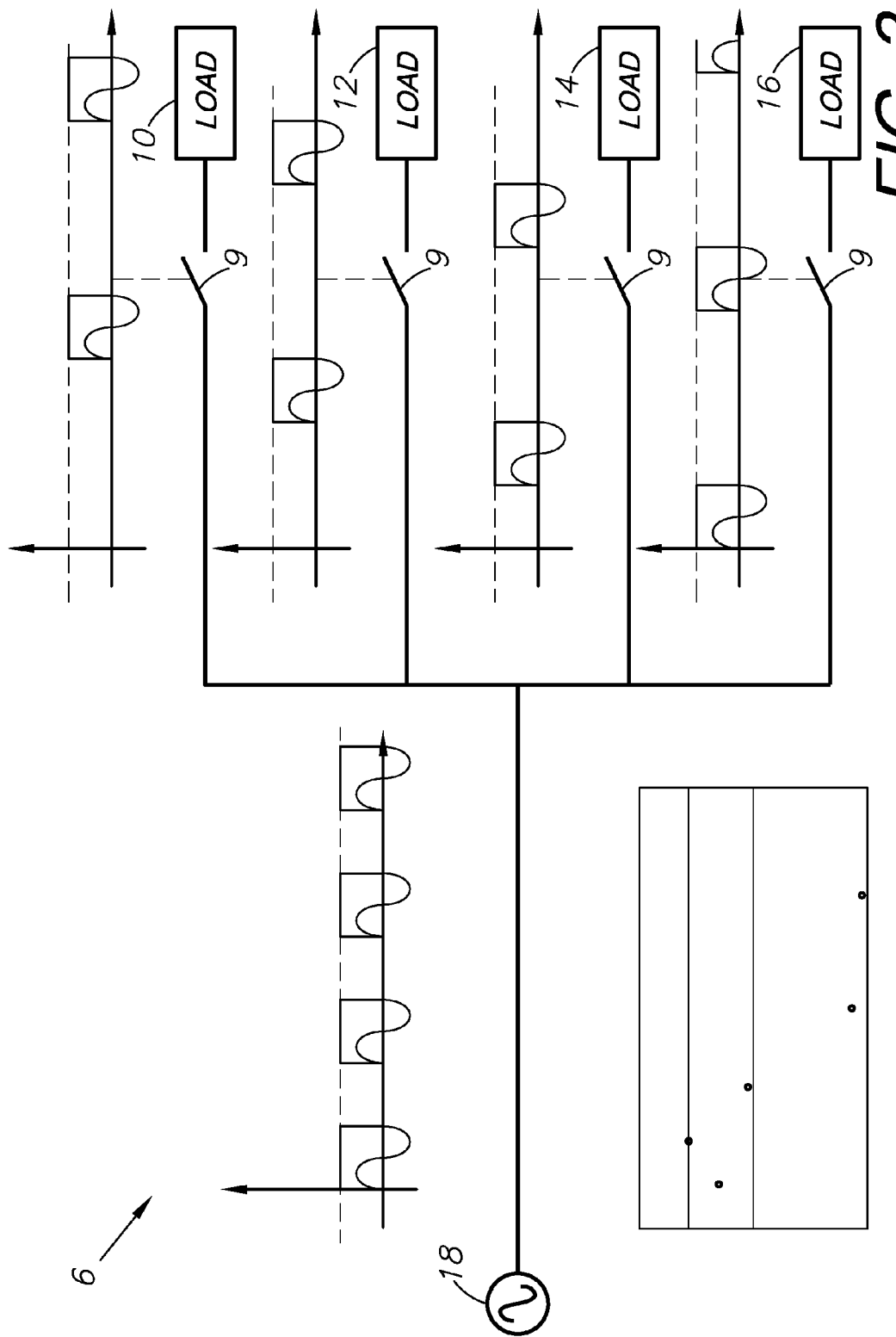
FIG. 2 is a signaling diagram representing a prior-art system with a power source connected to multiple equivalent loads by independent PWM switches, whereby the switches are switched on and off in synchronized phase spread timing.
Figure 3:
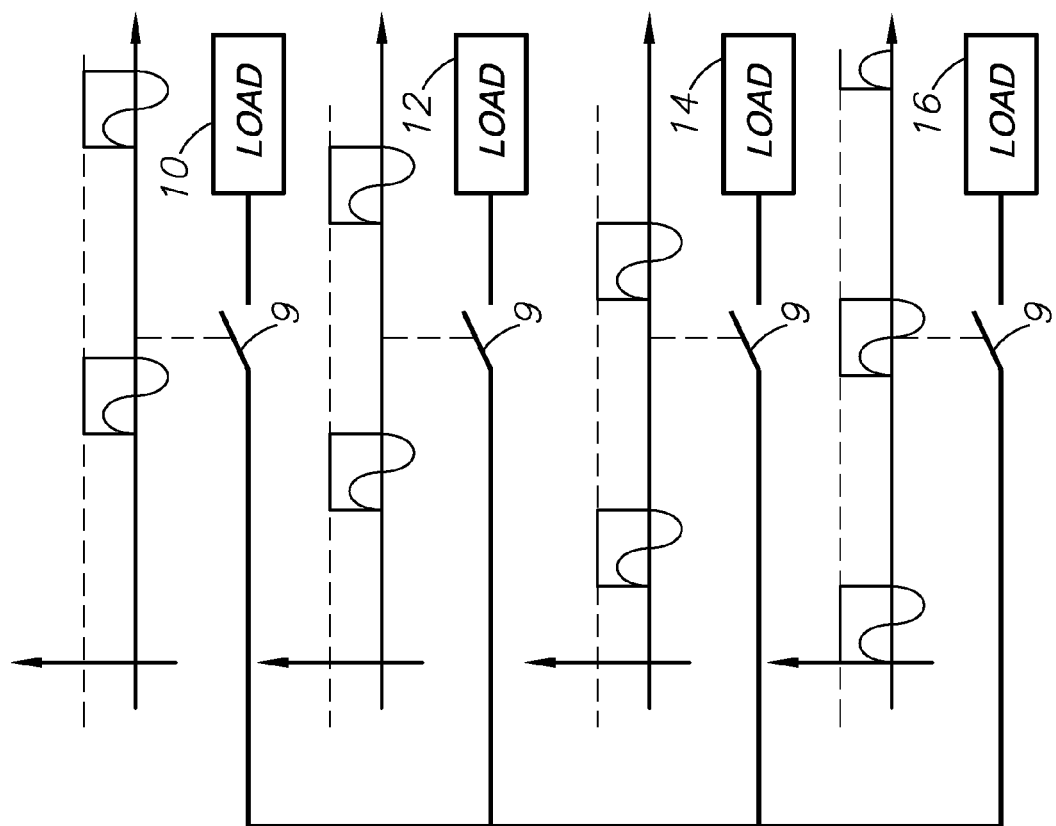
FIG. 3 is a signaling diagram representing the present invention with a power source connected to multiple equivalent loads by independent PWM switches, whereby the switches are switched on and off in a serial or phase load leveled timing.
Figure 4D:
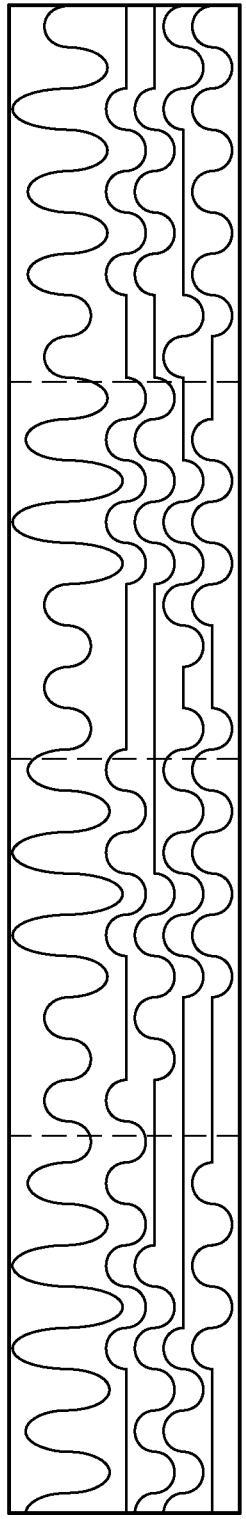
FIG. 4D is a signal waveform produced by a prior-art non-coherent random phase spreading system.
Figure 4E:
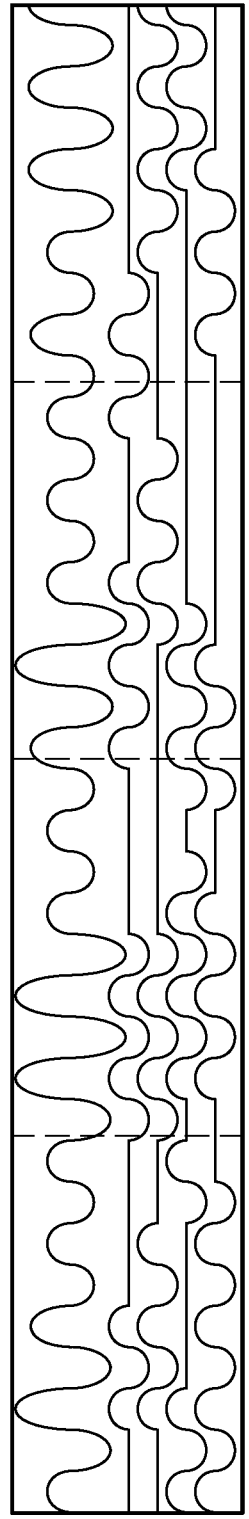
FIG. 4E is a signal waveform produced by a prior-art non-coherent random phase spreading system.
Figure 5A:
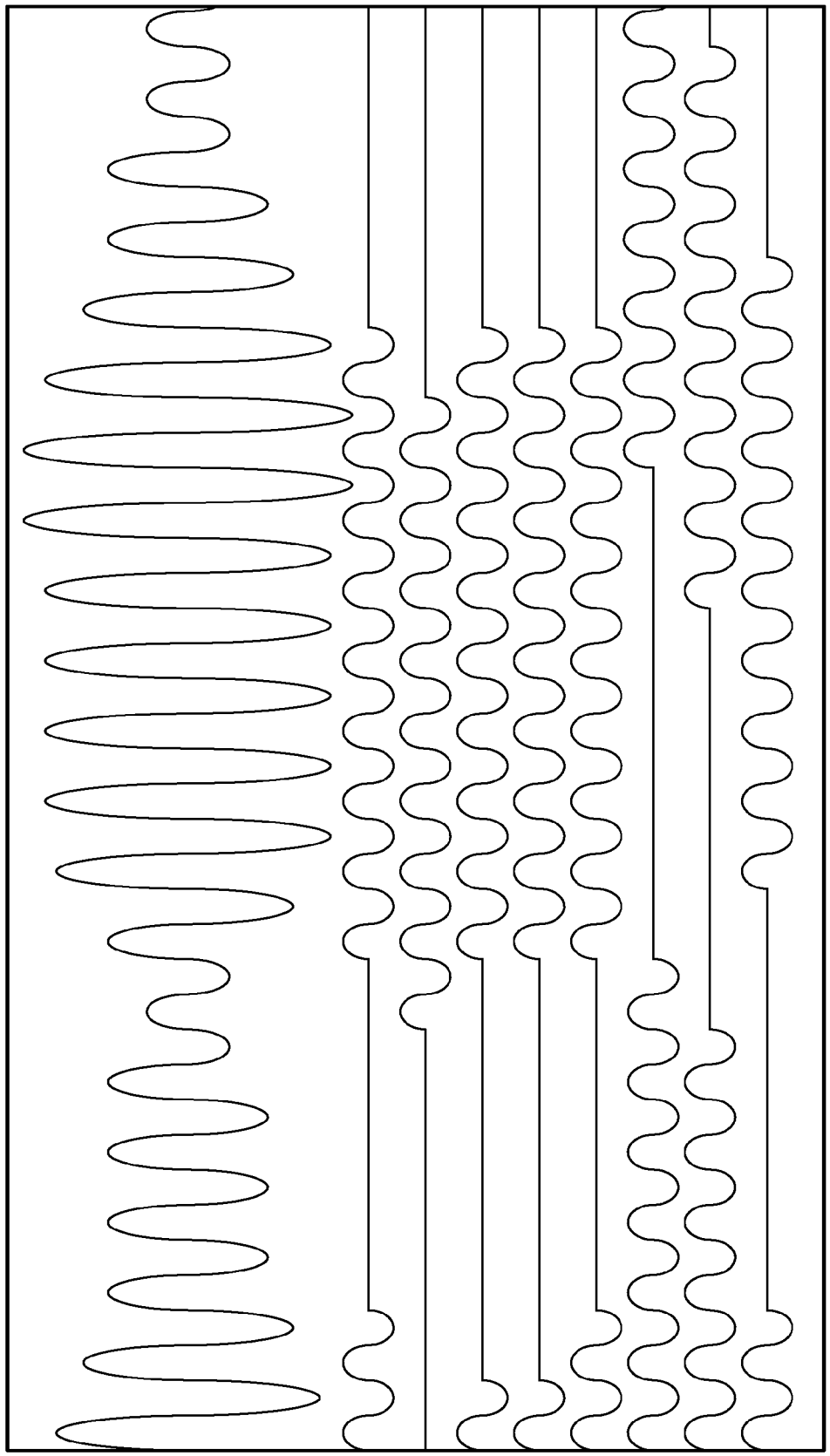
FIG. 5A is a signal waveform produced by a prior-art non-coherent clock phase spreading system.
Figure 5B:
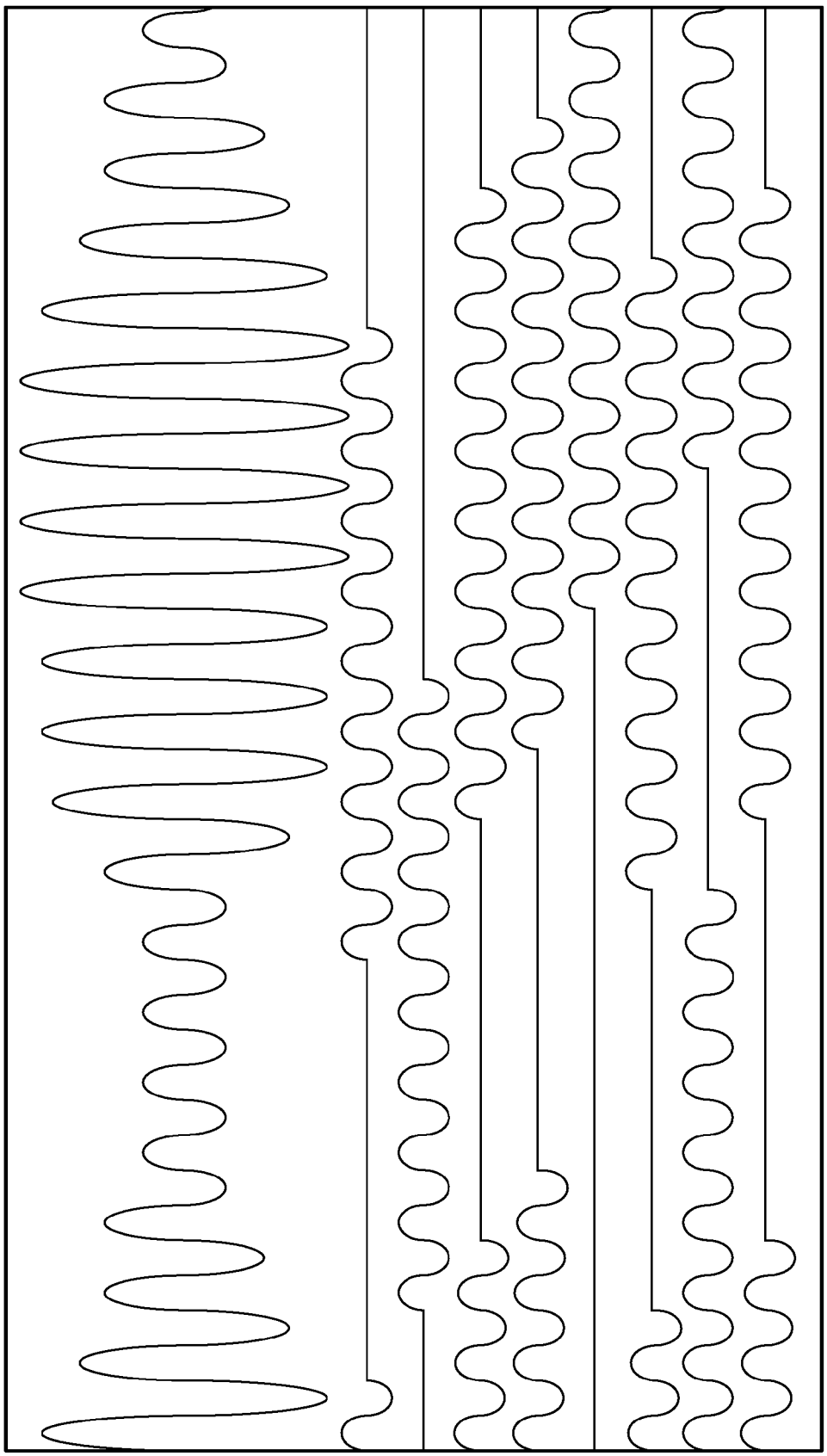
FIG. 5B is a signal waveform produced by a prior-art non-coherent clock phase spreading system.

FIGS. 1-3 demonstrate how the present invention differs from the prior art. FIGS. 1 and 2 demonstrate compounded power source transients that far exceed that of any of the individual loads. FIG. 1 is a diagram representing a prior art power control system 4 with non-spread synchronized switching. As can be seen, the synchronized effect as shown produces a combined load on the power source four times that of each individual load source. This is true for a system with four loads. A system with eight loads would experience a load 8 times larger than the individual load sources, and so on.

FIG. 2 similarly is a diagram representing a prior art power control system 6 with synchronized phase spreading. This system attempts to avoid the large load on the power source that was produced in FIG. 1; however, a number of "on-off" switching commands is sent to the power source in this example. With four load sources, the number of "on-off" signals is four times that of a single load source. This has similar problematic effects on the power source or generator.

Unlike conventional systems where PWM periods and phase are static constants, the period, duty cycle, and phase are dynamic. The PWM phase offset is described in terms of the time difference in turn-on transitions relative to a shared PWM cycle. In the AC case, phase may be counted by the number of AC supply cycles offset between individual PWM circuits. In FIG. 2, each load is offset relative to another by one-fourth or 25% of the PWM cycle, or 2 out of 8 AC supply cycles.

The general circuits and methods that follow apply to both AC and DC power supplies, but this discussion will generally use an AC supply as the example. For AC systems, whole cycle, zero-cross switching is presumed, so switching on or off is synchronized to the rising zero-cross. As such, a difference between emissions in the DC versus AC case is the convolution of the DC rectangle wave distribution by the modulating AC sine wave distribution.

The present invention generally introduces synchronized phase spreading system 2 which relies on spreading a number of switches 9 apart by a portion of a cycle. In coherent or synchronized phase spreading, the phases of the PWM switches are synchronized but individually offset by fixed amounts to evenly distribute either the switch-on or switch-off events over the shared PWM cycle, i.e., the switch-on points of: 2 switches are distributed ½ PWM cycle apart; 3 switches are distributed ⅓ PWM cycle apart; and 4 switches are distributed ¼ PWM cycle apart as shown in FIG. 2.

Figure 7A:
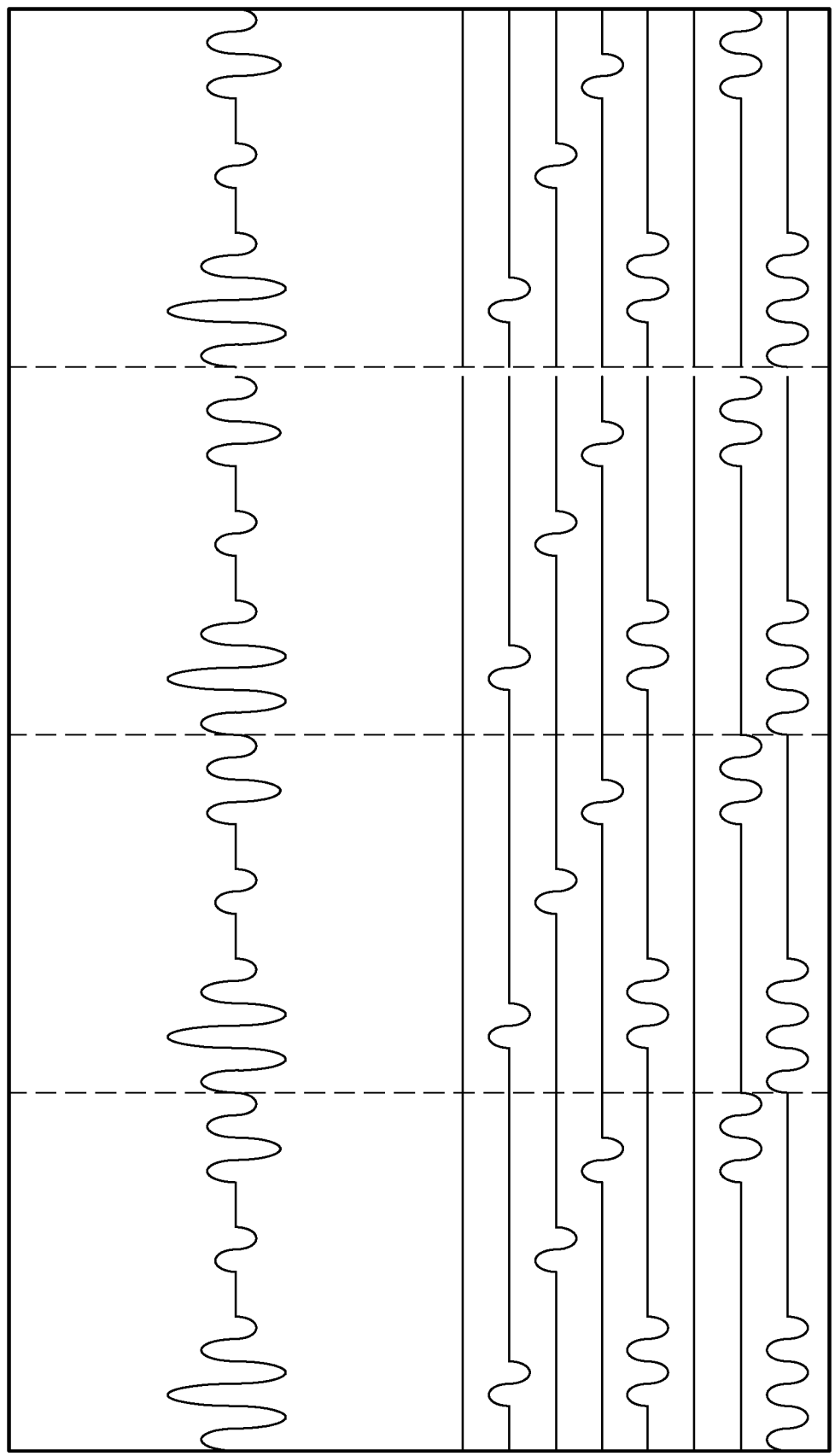
FIG. 7A is a signal waveform with significant oscillating transients produced by a prior-art synchronized phase spreading system.
Figure 7B:
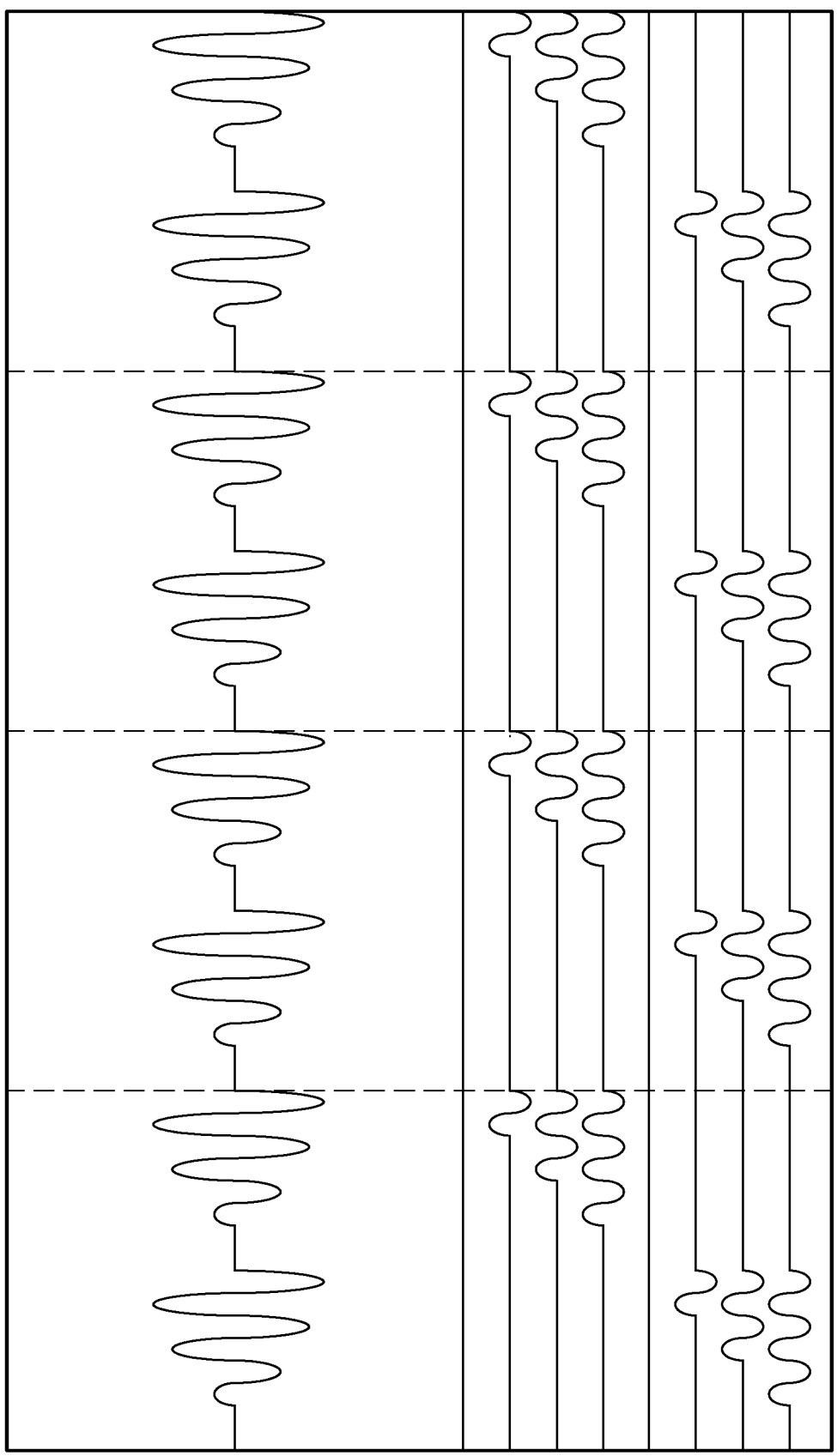
FIG. 7B is a signal waveform with significant oscillating transients produced by a prior-art synchronized phase spreading system.

This method gives some improvement over Non-Spread Switching (compare the harmonic distributions in FIGS. 1 and 2). However, this method retains the possibility of strong, sustained harmonics, that is, certain combinations of duty cycles may produce sustained strong harmonics. While it is apparent that for the same power delivery there are fewer harmonic components in FIG. 2 than in FIG. 1, those that remain are just as strong. If the system has resonate avoid bands, such as in an aircraft, synchronized phased spreading does little to decrease the effective width of those bands. It may be that most of the time the harmonics may be small, but the design must consider the maximum possible harmonics when avoiding known bands of resonance. A few more examples are given in FIGS. 7A and 7B. Furthermore, this method only avoids simultaneous switch-on; sustained simultaneous switch-off is completely possible as illustrated in the bottom of FIG. 7B.

While many if not most load combinations of phase-spread emissions could be much lower than that of non-spread equipment, emissions could approach that of non-spread equipment in some other load combinations. Exhaustive testing would be required to completely characterize all arbitrary waveform emissions that the system is capable of sustaining.

FIGS. 4A-6C provide waveform patterns associated with such prior art systems and described above. These are further examples of the problems with existing systems.

III. Serial/Phase Load Leveling System 2

The present system consists of a number of high power (e.g., tens of kilowatts per switch) PWM zero-cross, switching Power Control Modules (PCMs). These circuits share a smaller number of power supplies; that is, multiple PCMs may share a single generator that is presumed to be susceptible to large load transients and know resonance.

Additionally, this system is intended for critical and EMI-sensitive applications. As such, it is desired to provide a qualifiable and deterministic system that consistently minimizes load transients and harmonic emissions. With this design objective, the present system has, at any instant, the emissions of no more than one PWM load superpositioned with zero or more constant, non-modulated (100%) loads.

The main feature of the present invention is an apparent constant load on the power source generator. One load can be set to turn off at the same zero-cross that another load turns on and thereby present no transient to the power supply at the transition between loads. Furthermore, in this system, the PWM switches are independently and arbitrarily controllable with respect to period, duty cycle, and phase. As such, a set of independent PWM duty cycles may be scheduled such that just as one ON-time ends, another ON-time starts in a manner that maintains a constant load on the source.

In the example of FIG. 3, four 12.5% PWM cycles are serially combined by this system 2 to form a single 50% PWM cycle 8, from the perspective of the source 18.

When the combination of ON-time duty cycles exceeds the PWM cycle, excess ON-time can be folded modulo fashion to the beginning of the common PWM cycle as needed to completely distribute all of the ON-time duty cycles.

In this manner, an arbitrary schedule of PWM loads may be combined and serially "transmitted", yet have no more transient effect on the supply than a single PWM load. The switches may be viewed as receiving trains of power cycles from the source, which they break up and route to the different PWM cycles. Thus, an arbitrary number of arbitrary width pulses may be serially drawn from the power source without transient effects or emissions above that of a single PWM load.

This method presents the smallest number of possible waveforms to the supply and to the conducted and radiated EMC environment. Any load combination is convertible to a single PWM load superposed on a finite number of constant 100% loads. Thus, for any combination of Phase Leveled Loads, the EMI characteristics are a superposition of the characteristics of one PWM load superposed on the characteristics of one constant load.

FIGS. 8-14 provide explanations illustrating how a number of different PWM cycles can be combined to always form the effect of a single PWM cycle.

FIG. 8 demonstrates a first load 10 at 10% and a second load 12 at 20%. The result on the power source is one 30% load.

FIG. 9 demonstrates a first load 10 at 10%, a second load 12 at 20%, and a third load 14 at 30%. The result on the power source is one 60% load.

FIG. 10 demonstrates a first load 10 at 10%, a second load 12 at 20%, a third load 14 at 30%, and a fourth load 16 at 40%. The result on the power source is one continuous 100% load.

Figure 11:
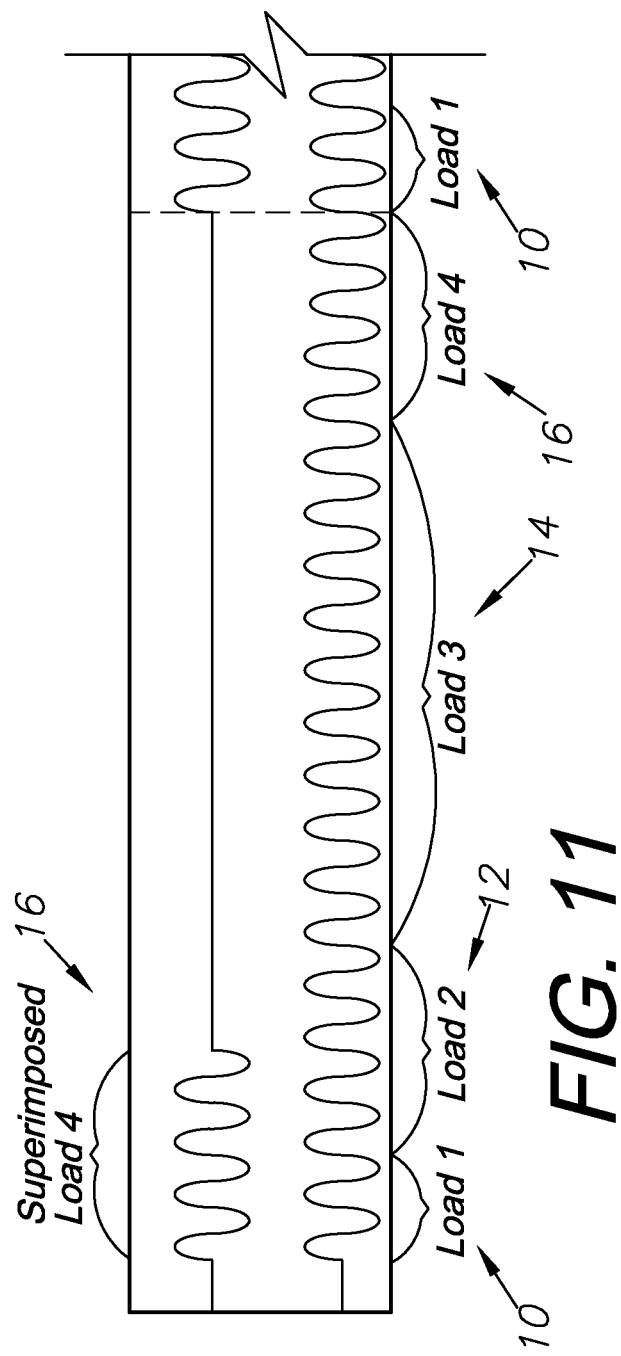
FIG. 11 is a signal waveform of a PWM cycle wherein a first load is at 10%, a second load is at 20%, a third load is at 50%, and a fourth load is at 40%.

FIG. 11 demonstrates a first load 10 at 10%, a second load 12 at 20%, a third load 14 at 50%, and a fourth load 16 at 40%. The total of duty cycles to level across one PWM cycle is 120%. Thus, the fourth load 16 is split so that it is on for 20% at the end of the PWM cycle but also on for 20% at the beginning of the PWM cycle. The effect is one 100% continuous load on the power source with an additional 20% load superimposed at the beginning of each PWM cycle.

Figure 12:
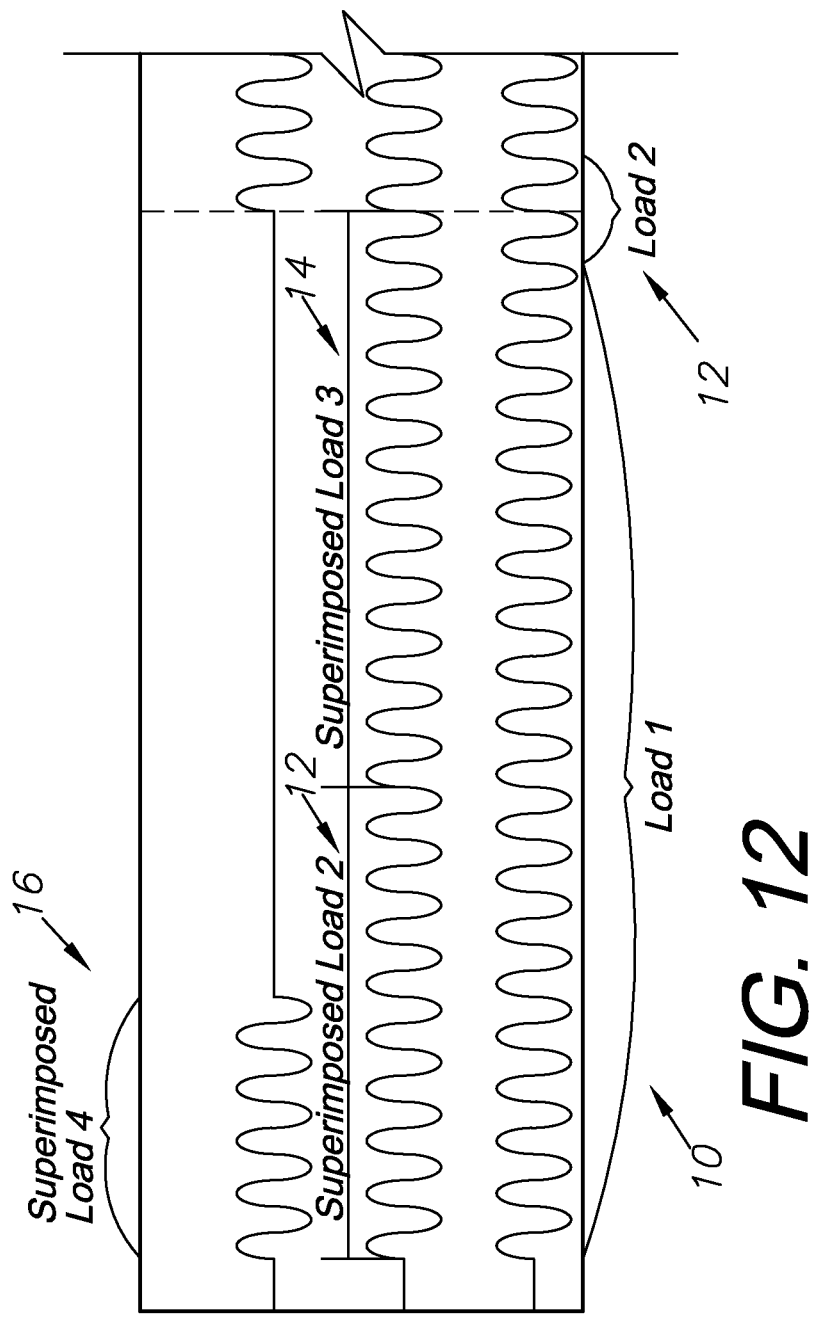
FIG. 12 is a signal waveform of a PWM cycle wherein a first load is at 90%, a second load is at 50%, a third load is at 50%, and a fourth load is at 40%.

FIG. 12 demonstrates a first load 10 at 90%, a second load 12 at 50%, a third load 14 at 50%, and a fourth load 16 at 40%. The total of duty cycles to level across one PWM cycle is 230%. Thus, the third load is split so that it is on for 10% at the end of the PWM cycle but also on for 40% at the beginning of the PWM cycle, and the forth load is split so that it is on for 10% and 30%. The effective result is two 100% continuous loads on the power source with an additional 30% PWM load superimposed on the front end of the PWM cycle.

It should be observed that as individual loads are split and excess load that exceeds the length of the PWM cycle is wrapped to the beginning of the cycle, these split loads do not necessarily experience switching at the PWM cycle boundaries. In the example shown in FIG. 12, even though the second 12 and third 14 loads are split, their switches in fact stay "on" as the end of each PWM cycle passes.

FIG. 13 illustrates the loads from FIG. 12 shown separately. FIG. 14 illustrates the total combined load from the four individual loads, as it would appear to the power source.

IV. Switch Scheduling

Key to performing Serial Load Leveling is the ability to coordinate individual PWM switch cycles into a system schedule and then control the switches according to that schedule. The following describes important features of the system necessary for this scheduling.

The scheduling of PWM switch cycles is based on a common PWM cycle. The common PWM cycle is provided for all PWM switches either through a common PWM counter or through distributed synchronized counters. The counter(s) runs at a fixed rate from an initial preset value to the value that indicates the end of the common PWM cycle. When the end value is reached, the schedule for the next PWM cycle is set, the preset value is loaded into the counter, and the next common PWM cycle is started.

Individual Switch Scheduling can be used to achieve the results of load leveling. The system 2 has provision to start each individual switch's PWM ON-time at any discrete time within each common PWM cycle. FIGS. 15A-15E illustrate this practice of individual switch schedulability. In FIGS. 15A-15D, the PWM ON-times are scheduled to start at the 0%, 25%, 50%, 75% offsets, respectively. FIG. 15E illustrates variation of start time offsets and ON-time duty cycle from one PWM cycle to the next. For example, cycles 20, 22 and 24 are shown in FIGS. 15A-15E.

The "void" space between the ON-times of the subsequent PWM cycles of the single switch represents time that could be allocated to the ON-time of other switches. System switch scheduling comes into play here. With the ability to individually schedule distinct switches, the system may coordinate all of the switch cycles into a coherent system switch schedule. In the scheduling process, the system will determine a start time (offset) for each switch within each switch's PWM cycle.

Given PWM duty cycle ON-times for a set of switches, the Serial Load Leveling process determines a coordinated set of start times that, following a single "first switch", cause one switch to close at the instant another opens.

Given an ordered set of switches, the system schedules the first switch to close at the same time the common PWM cycle starts; the second switch to close at the same time the first switch is scheduled to open, and so forth through to the last of the set of switches.

Alternatively, in Wrap Scheduling, switch ON-times that overrun the end of the common PWM cycle are wrapped around to the beginning of the PWM cycle as follows.

When, for a given start time, the duty cycle for the switch is less than the remaining PWM cycle, the switch will have a single ON-time for that period. However, if the duty cycle for the switch is less than the remaining PWM cycle, any excess is allocated to the beginning of the PWM cycle.

Figure 15A:
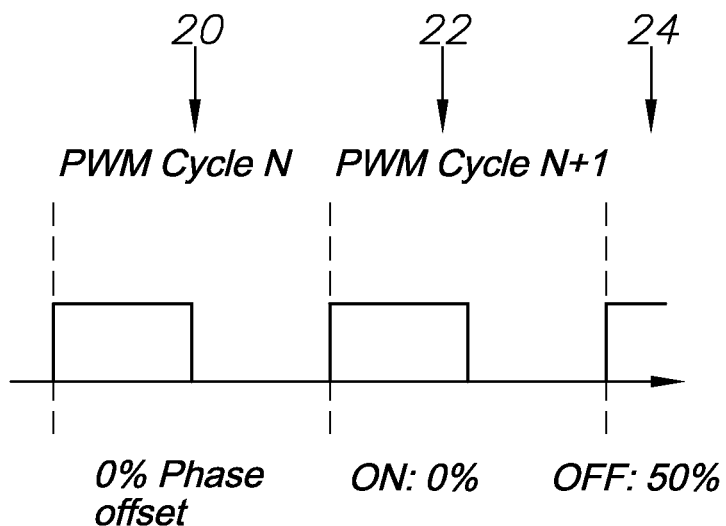
FIG. 15A is a switch diagram illustrating the practice of switch schedulability where a phase offset is 0%.
Figure 15B:
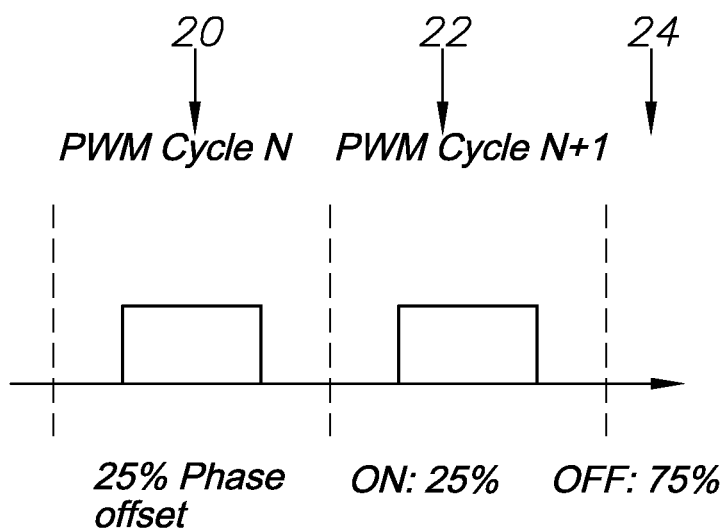
FIG. 15B is a switch diagram illustrating the practice of switch schedulability where a phase offset is 25%.
Figure 15C:
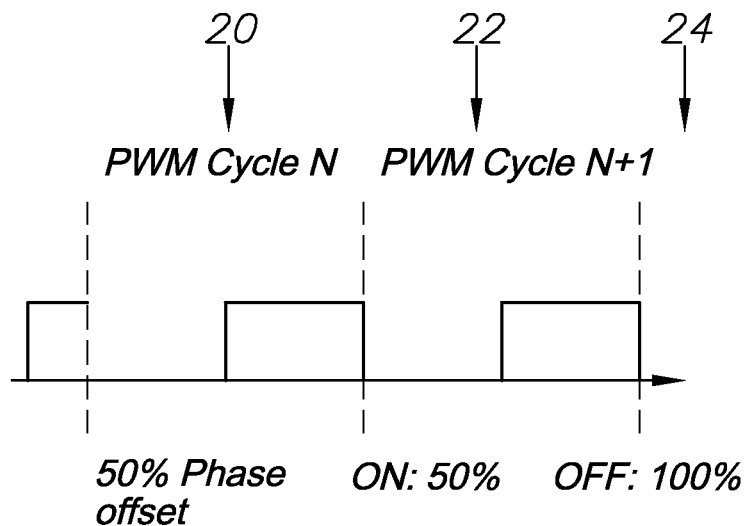
FIG. 15C is a switch diagram illustrating the practice of switch schedulability where a phase offset is 50%.
Figure 15D:
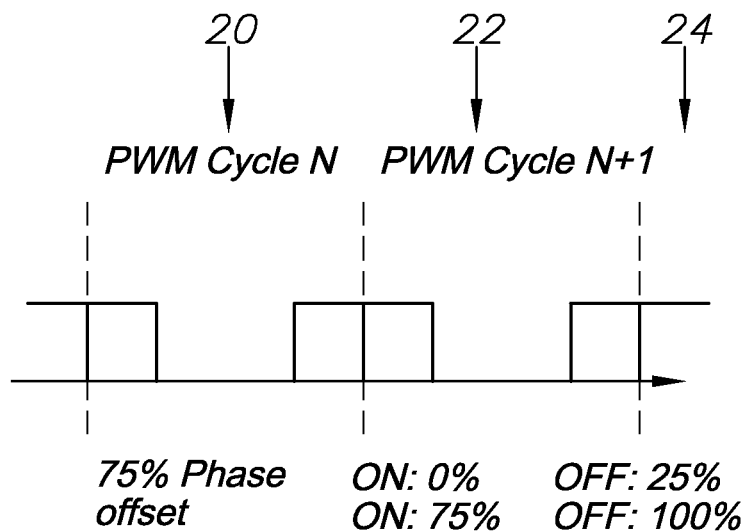
FIG. 15D is a switch diagram illustrating the practice of switch schedulability where a phase offset is 75%.
Figure 15E:
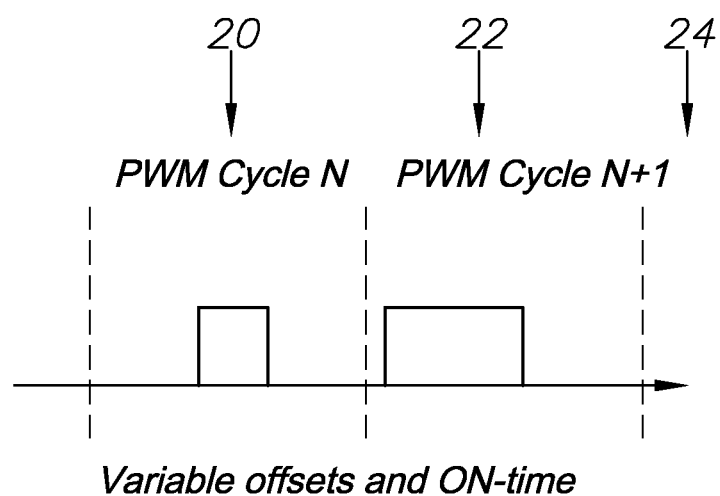
FIG. 15E is a switch diagram illustrating variable phase offset and "ON" time results.

FIG. 15D illustrates the Wrap Scheduling practice of distributing any ON-time that "runs over" the end of the PWM cycle to that cycle's beginning. In this situation, the switch's ON-time is split into two smaller pulses.

Wrap Scheduling requires a central coordinator (e.g., software on a microcontroller) to calculate and set the schedule for all switches. The control of the individual switch PWM cycles may also be centrally controlled; however, in the present system, the control of each switch's PWM cycle is distributed to the individual switches.

The scheduling of PWM cycles may be implemented in sets of independent control registers provided for each PWM switch. For this method of control, while one collective system PWM cycle is in operation, the schedule for the next PWM cycle is calculated and then written to the control register buffers (as defined below).

When the end value of the system PWM cycle is reached, schedule for the next PWM period is loaded into the control registers, the preset value is loaded into the common PWM counter, and the next common PWM cycle is started.

At a minimum, one register is required for each switch to maintain the ON-time setting for the present PWM period. One or more additional register may be required depending on the scheduling method, e.g., implementation of Wrap Scheduling requires a few more registers to define the additional transitions that occur when an ON-time is split.

Multiple register control methods are available. An array of registers could schedule the initial state (ON/OFF) followed by values that cause the state to toggle as the PWM counter passes those settings. Alternatively, an array of registers could schedule pairs of subsequent turn-on and turn-off events as the PWM counter passes those settings. Additionally, state logic could be employed to provide additional robustness as needed.

To decouple the register servicing from PWM operations, these registers are buffered. Communication/Control services write to the buffers asynchronous to the PWM operations while PWM services read from these buffers synchronous to the PWM operations. In this manner, the registers may be updated with settings for the next PWM period at any time without disrupting the ongoing PWM cycle.

While Wrap Scheduling is the scheduling method used by the present system, Token Passing is an alternative scheduling technique that eliminates the need for a central processor for scheduling. Each switch has knowledge of its own ON-time duration (as in the wrapping method), but only the "first switch" operates precisely synchronized to the common PWM cycle. As each switch finishes its ON-time, it passes a signal to the next switch permitting that switch to perform its ON-time.

Only the first switch starts its ON-time at the beginning of each common PWM cycle. Every other switch starts its ON-time only when it receives a token from the preceding switch. Each switch passes said token when it completes its ON-time. The last switch passes no token. Multiple tokens will be passing through the system when the total ONtime for all switches exceeds the common PWM cycle. The result of Token Passing is to modulate the PWM period of each switch forward or back in time to affect a serial stream of uninterrupted power cycles from the source.

Token Passing may be used in systems with minimal digital circuitry. For example, in relatively non-digital systems, Token Passing may be used in an analog PWM system to align ramp oscillators such that as one switch opens another closes, i.e., the opening of one switch starts the ramp cycle of the next switch.

The methods and system capabilities required for Serial Load Leveling may be used to accomplish other applications. The ability to dynamically control the duty cycle, period, and phase permits manipulation of AC loads to a relatively fine degree (e.g., changing these parameters in an AC system on a cycle by cycle basis, within the limits of the system's bandwidth).

Where such action would result in further improvement of other effects of concern, the single PWM load modulation remaining after Serial Load Leveling may be rotationally distributed. In such cases, power distribution can be balanced "around" the cycle at the expense of additional single-load power transitions. For example, consider that either a single 7-out-of-12 pulse or a combination of one 1-out-of-4 and two 1-out-of-6 rotationally symmetric pulses transmit equal power. See FIGS. 16A and 16B for illustration.

Since this system is capable of modulating the PWM period, the system could alternatively be used to increase resolution below the single cycle limit by manipulating pulse period relative to pulse width. Also, where there is a limit for minimum on or off pulse width, pulse-period modulation could be used to effect smaller duty cycles. If for example a system is limited to a pulse minimum of 10 ms, then 10%, 5% and 1% duty cycles may be produced by modulating the period to 100 ms, 200 ms, and 1000 ms, respectively.

Likewise, a Serial Load Leveling system with central processing would alternatively be capable of Delta-Sigma Modulation and Pulse-Density Modulation. Limited by the number of switches, these methods and system capabilities facilitate formation of arbitrary waveforms.

In systems where remote switching of a sequence of N register-less switches is affected by cycling of applied power, such as the system described in U.S. Pat. No. 7,355,302 which is incorporated herein by reference, duty cycle is nominally limited to 1/N. Application of Token Passing in the remote components could permit extension of the duty cycle in such systems to 100%. The power cycling system is adjusted such that the power cycling sets the ON-time of a designated "first switch", which then generates tokens to control subsequent switch timings as duplicates of the first switch timing.

It is to be understood that the invention can be embodied in various forms, and is not to be limited to the examples discussed above. The range of components and configurations which can be utilized in the practice of the present invention is virtually unlimited.

Having this described the invention, what is claimed as new and desired to be secured by Letters Patent is:

1. A serial load control subsystem for leveling a cumulative electrical load in a system including multiple, individual, electrical loads and a power source selectively connected to the electrical loads by the control subsystem, which load control subsystem includes:
   a plurality of pulse-width modulation (PWM) switches each selectively connecting the power source and a respective individual electrical load;
   a controller adapted for programming with a PWM switch cycle schedule;
   said controller being connected to the PWM switch and adapted to provide scheduled switch signals to said PWM switch;
   said scheduled switch signals being adapted to control said PWM switch operation to minimize electromagnetic emissions from said system;
   said controller including a scheduling function adapted for calculating a schedule of opening and closing the plurality of switches to provide a minimum load variance among said plurality of switches;
   said scheduling function being adapted to open a respective switch when another switch closes;
   said processor including a wrap scheduling function adapted for accommodating a duty cycle for a switch if the duty cycle is less than a remaining PWM cycle: by providing a single On-time for a period; and by allocating any excess to the beginning of the PWM cycle;
   a central coordinator connected to said processor;
   said wrap scheduling function being accomplished by said central coordinator;
   said wrap scheduling function is accomplished by distributing control of each switch's PWM cycle to a respective individual switch;
   multiple control registers each connected to a respective PWM switch and adapted for maintaining an ON-time setting for a present PWM period which is less than a remaining PWM cycle;
   said control registers being adapted for loading with a next PWM period when an end value of a system PWM cycle is reached and the next PWM cycle is started;
   an additional register for implementing wrap scheduling by defining additional transitions occurring when an On-time is split;
   an array of registers adapted for scheduling initial On/Off states followed by phase settings causing the On/Off states to toggle as a PWM counter passes those settings;
   an array of registers adapted for scheduling pairs of subsequent turn-on and turn-off events as the PWM counter passes those settings;
   said processor includes a state logic function adapted for controlling said registers;
   said registers being buffered;
   a plurality of buffers adapted for being written to asynchronously with the PWM operations;
   said registers being updated with settings for the next PWM period without disrupting an ongoing PWM cycle;
   a token passing scheduling technique wherein each said PWM switch is provided with its own On-time duration and a first switch is synchronized to a common PWM cycle;
   as each switch finishes its On-time, it passes a token signal to a next switch permitting that switch to perform its On-time;
   an analog PWM system for aligning ramp oscillators whereby closing a switch results in opening another switch and starting a ramp cycle of the next switch;
   said processor including a rotational distribution for PWM load modulation remaining after serial load leveling whereby rotationally symmetric pulses transmit equal power;
   a PWM procedure is used for affecting smaller duty cycles;
   wherein said processor includes a delta-sigma modulation, pulse-density or pulse-coded modulation function for forming arbitrary waveforms; and
   a power cycling function sets an On-time of a designated first switch, which is adapted for generating tokens to control subsequent switch timings as duplicates of the first switch timing.

2. The serial load control subsystem according to claim 1, which includes:
   effectuating proportional modulation of power from the power source.

3. The serial load control subsystem according to claim 1, wherein said power source provides DC powered loads.

4. The serial load control subsystem according to claim 1, wherein said power source provides AC powered loads.

5. The serial load control subsystem according to claim 1, further comprising:
   a switch controller adapted for controlling said plurality of switches;
   a scheduling computer adapted for calculating said schedule; and
   wherein said scheduling computer and said switch controller are physically distinct.

* * * * *